United States Patent [19]

Boucher et al.

[11] Patent Number: 6,012,065

[45] Date of Patent: Jan. 4, 2000

[54] METHOD AND SYSTEM FOR ACCESSING CARRIER DATA

[75] Inventors: Glenn Boucher, Shelton; Jacques E. Hasbani, Bethel; Terri A. Carroll, Milford; Kenneth Karbowski, Farmington; Stephen C. Nunnally, Bridgewater; Edward M. Rauh, West Haven, all of Conn.

[73] Assignee: Pitney Bowes Inc., Stamford, Conn.

[21] Appl. No.: 08/942,263

[22] Filed: Sep. 30, 1997

[51] Int. Cl.[7] .................................................. G06F 17/30
[52] U.S. Cl. ............................................................. 707/103
[58] Field of Search .................................. 707/1, 10, 103; 705/14

[56] References Cited

U.S. PATENT DOCUMENTS

| | | | |
|---|---|---|---|
| 4,249,241 | 2/1981 | Aberle et al. | 395/500 |
| 5,193,180 | 3/1993 | Hastings | 395/710 |
| 5,293,310 | 3/1994 | Carroll et al. | 705/14 |
| 5,337,246 | 8/1994 | Carroll et al. | 364/464.02 |
| 5,367,671 | 11/1994 | Feigenbaum et al. | 707/1 |
| 5,485,369 | 1/1996 | Nicholls et al. | 364/401 |
| 5,548,756 | 8/1996 | Tantry et al. | 707/10 |
| 5,631,827 | 5/1997 | Nicholls et al. | 365/228 |
| 5,752,027 | 5/1998 | Familiar | 707/103 |

OTHER PUBLICATIONS

Object–Oriented Modeling and Design, Prentice Hall, Schenectedy, New York, no date.

*Primary Examiner*—Wayne Amsbury
*Assistant Examiner*—Cheryl Lewis
*Attorney, Agent, or Firm*—Charles R. Malandra, Jr.; Melvin J. Scolnick

[57] ABSTRACT

The invention is a method and system of loading a data object representative of carrier data and possible command structures, which can be identified by both name and date fields characteristics, into a Data Access System of a carrier management system. The method begins with receiving a request for an object and then determining whether or not the object resides in a first data table which is indicative of a plurality of characteristics of the object. If the object is not resident in the first data table, then the system assigns an initial time stamp and a permanence value to the object. Additionally, the method and system must determine the memory space, in the Data Access System, required for storing the object. De-referenced objects are removed from the memory until space is available that is greater than or equal to the memory requirement of the object. After memory is allocated to the object, the object is then loaded into the memory for use within the carrier management system. A directory table is then established for the object. The directory table includes: an object name; a set of associated data; and, an object table data pointer. The associated data includes an effective date; an expiration date; and, the modification status of the file.

6 Claims, 6 Drawing Sheets

METHOD AND SYSTEM FOR ACCESSING CARRIER DATA

RELATED APPLICATIONS

Reference is made to application Ser. No. 08/942,265, abandoned entitled INSTALLING SOFTWARE BASED ON A PROFILE, assigned to the assignee of this application and filed on even date herewith.

Reference is made to application Ser. No. 08/942,209, pending entitled CARRIER MANAGER INTERFACE UTILIZING AN OCX CONTROL, assigned to the assignee of this application and filed on even date herewith.

Reference is made to application Ser. No. 08/942,264, pending entitled A METHOD AND SYSTEM FOR CHANGING RATING DATA VIA INTERNET OR MODEM IN A CARRIER MANAGEMENT SYSTEM, assigned to the assignee of this application and filed on even date herewith.

Reference is made to application Ser. No. 08/942,262, pending entitled A METHOD AND SYSTEM OF IMPLEMENTING A CARRIER MANAGER LIBRARIAN, assigned to the assignee of this application and filed on even date herewith.

Reference is made to application Ser. No. 08/942,260, pending entitled A METHOD AND SYSTEM OF IMPLEMENTING A CARRIER MANAGER REGISTRY, assigned to the assignee of this application and filed on even date herewith.

Reference is made to application Ser. No. 08/942,261, pending entitled EVENT INTERFACE FOR A CARRIER MANAGER SYSTEM, assigned to the assignee of this application and filed on even date herewith.

BACKGROUND OF THE INVENTION

The prior art works well in embedded systems or in an intranet environment where the systems administrator or systems user has some measure of control over the operating system platforms that are storing data, applying rating charges, and storing the data within a data center. However, the advancement of data processing systems and the ability of varying logistics services applications to require data sharing for the purposes of optimizing logistics operations has created a definitive need for systems of varying architecture, and with varying operating systems, to be able to share data within a common environment. Thus, there is a need for a logistics/shipping system capable of managing diverse applications within a common environment for optimal service. Additionally, a method of employing the rating functionality of one application within the functionality of another application is required.

As the capabilities of data processing systems has grown, so too have the requirements that are tasked to these systems. Greater speed has given rise to more detail oriented applications, greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

Once such means of promoting flexibility within a data processing system is in the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Thus, software applications become an organized collection of discrete objects in which data is held or moved based on the intended behavior of an object which is inherently unique. Each object knows how to perform some activity. Objects can be specific or conceptual. But, to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class.

OOD is known in the software arts and specific discussion of application design based upon OOD is not required for a thorough understanding of the applicant's claimed invention. The use of object oriented design, together with the use of an OCX to facilitate object oriented linking of diverse applications, is a distinct benefit when employed within data processing systems such as logistics systems with rating applications. Therefore, it is an object of the present invention to provide for an object oriented method and system of storing and accessing carrier data for use in a carrier management system.

SUMMARY OF THE INVENTION

The invention is a method and system of loading a data object, which can be identified by both name and date fields characteristics, into a Data Access System of a carrier management system. The method begins with receiving a request for an object and then determining whether or not the object resides in a first data table which is indicative of a plurality of characteristics of the object. If the object is not resident in the first data table, then the system assigns an initial time stamp and a permanence value to the object.

Additionally, the method and system must determine the memory space, in the Data Access System, required for storing the object. De-referenced objects are removed from the memory until space is available that is greater than or equal to the memory requirement of the object. After memory is allocated to the object, the object is then loaded into the memory for use within the carrier management system. A directory table is then established for the object. The directory table includes: an object name; a set of associated data; and, an object table data pointer. The associated data includes an effective date; an expiration date; and, the modification status of the file.

DETAILED DESCRIPTION OF THE PREFERRED EMBODIMENTS

Figure 1:
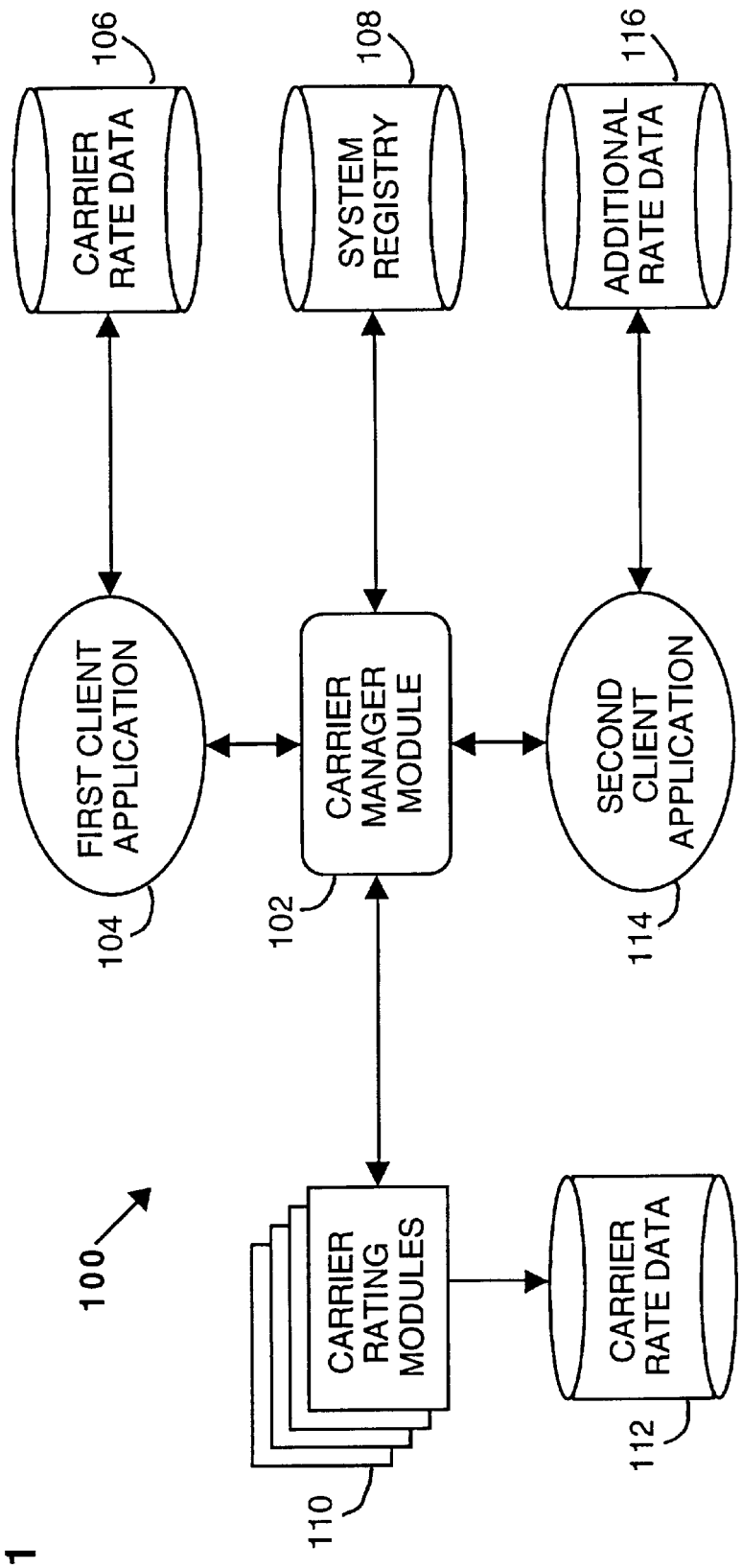
FIG. 1 is a block diagram of a typical logistics or shipping system as described within related applications as listed hereinabove.

Turning to FIG. 1 there is shown system 100 which is typical of logistics or shipping applications that can employ rating schemes to determine carrier charges based upon input from more than one input application.

Systems Overview

The heart of the system is run-time loadable carrier manager module 102 which is comprised of a rating engine for performing at least some of the rating related tasks. Carrier manager module 100 interfaces with first client application 104 which is configured to perform various shipping related tasks. The carrier manager module is further configured to access entries in system registry 108.

System registry 108 is responsible for run-time loading one of a plurality of carrier rate modules 110 as well as for registering all modules available to the carrier manager module 100. The carrier rating modules 110 are loaded into the executable space of first client application 104, thereby avoiding the use of resource intensive inter-process communication (IPC) mechanisms (IPC mechanisms would include "named pipes," etc.).

Each carrier rating module 110 includes program instructions to access carrier rate data 112 and rate items using business rules encapsulated therein together with rate data associated with a particular carrier. After loading a carrier rating module 110, the carrier manager module 102 provides an entry point in the carrier rate module 110 to the first client application 104. In this manner, first client application 104 can invoke the instructions in the carrier rate module 110 to rate an item (such as a particular parcel or a particular service) for the carrier associated with the selected rate module 110. Additionally, first client application 104 includes prior carrier rating routines of its own for rating items based on carrier rate data 106.

Carrier manager module 102 can also be loaded by a second client application 114, together with its additional rate data 116, for utilizing the carrier rating functionality of the carrier rating modules 110 as is described hereinabove in connection with the first client application 104. Thus, the isolated carrier rating modules 110, under control of carrier manager module 102 are arranged to provide carrier rating functionality for a plurality of client applications 104, 114, or possible others, as may be required by the system user or designer.

In some system configurations, the revision level of the first client application 104 may be such that they were developed prior to the design of the system architecture described herein. For example, first client application 104 may be a shipping application for rating parcels shipped by express carriers. When the carrier manager system 100 architecture is designed, it would be a relatively uncomplicated task to upgrade first client application 104 to access carrier management module 102 for the carrier rating functions in the new carrier rating modules 110. In the instant example, new carrier rate modules 110 may contain Less Than Truckload (LTL) rating routines for shipping items by truck. Thus, to add trucking functionality to first client application 104's legacy of functions, it is a relatively straightforward process to call the new carrier management module 102 to load the carrier rate modules 110 applicable to LTL rating activities.

First client application 104 still includes the prior carrier rating routines of its own for rating items based on carrier rate data 106 for carriers not supported by carrier rating modules 110. In the example, the shipping application still contains routines for rating parcels for supported carriers; however, it is difficult to extract the carrier rating routines from first client application 104 for creating a new carrier rating module 110. Systems that rely upon legacy data tend to break down if large scale modifications are made thereto because the data becomes incompatible with the new application that seeks to employ it. Replacing carrier rating routines within a new carrier manager architecture could lead at least to compatibility problems, or at worst to system breakdown.

Keeping the carrier rating routines in the first client application 104, instead of in the carrier rating modules 110, means that rating functionality for those carriers is not available to second client application 114. In the example, second client application 114 may be a load planning application. In the configuration shown in FIG. 1, load planning application (in this case second client application 114) only has access to the LTL rating routines of carrier rating modules 110 and not to the rating routines embedded in the legacy shipping application (in this case first client application 104). Thus, it is desirable to make the carrier rating functionality of first client application 104 available to second client application 114 without having to make extensive modifications to first client application 104. First client application 104, however, may be implemented in a programming language or operating system environment in which it very difficult (i.e. task intensive) to receive requests directly from second client application 114 for the purposes of rating.

Figure 2:
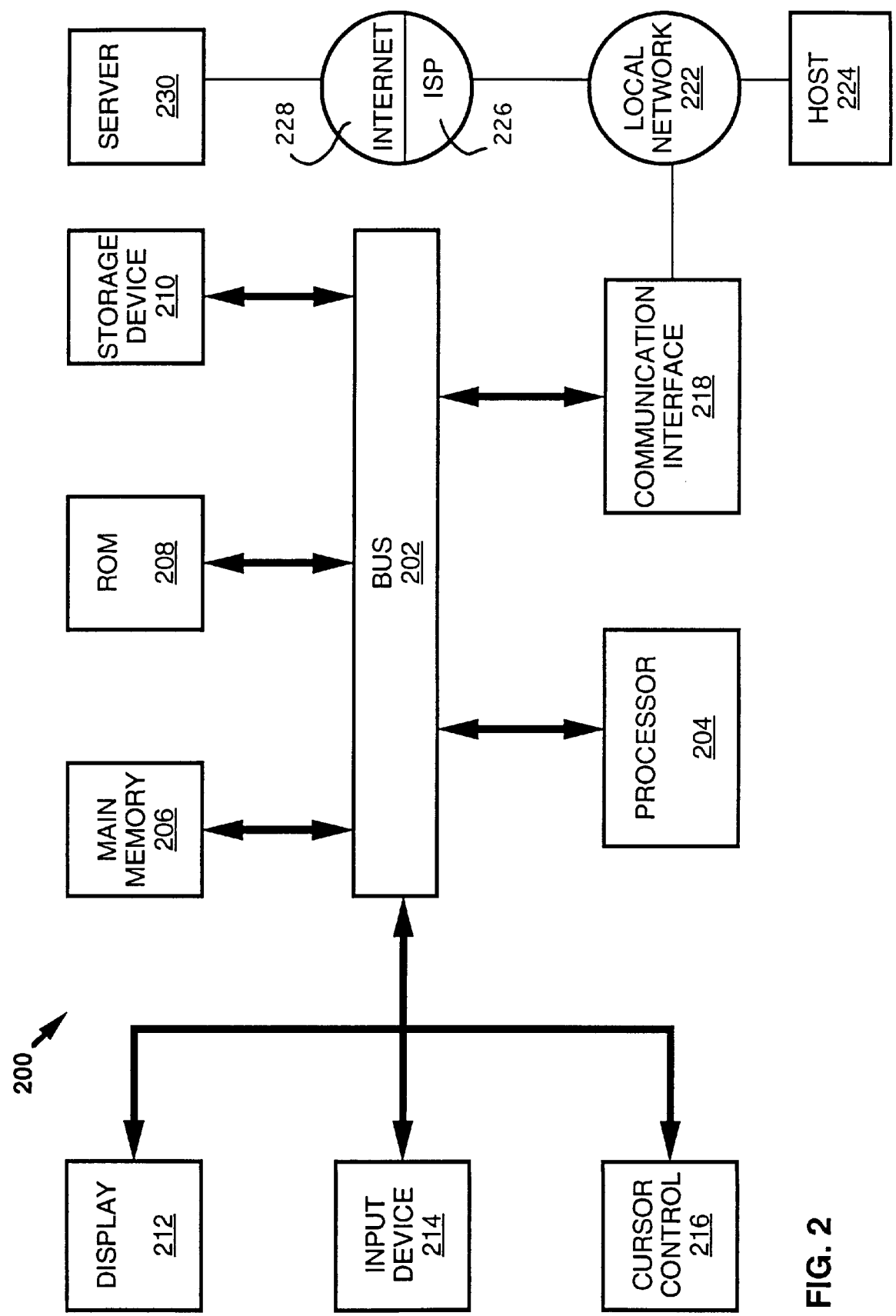
FIG. 2 is block diagram of a data processing system which is of an architecture that is suitable for implementing the claimed invention.

A method of employing the rating functionality of one application within the functionality of another is shown in FIG. 2.

Turning to FIG. 2, there is shown a block diagram of data processing system 200 which is of an architecture that is suitable for implementing the claimed invention.

Data processing system 200 comprises bus 202, or a similar communications means, for communicating information, and a processor 204 operatively coupled with bus 202 for processing data. Data processing system 200 also includes a main memory 206, such as a random access memory (RAM) or other dynamic storage device, coupled to bus 202 for storing data and instructions to be executed by processor 204. Main memory 206 also may be used for storing temporary variables or other immediate data during execution of instructions by processor 204. Data processing system 200 further comprises a read only memory (ROM) 208 or other static storage device coupled to bus 202 for storing static data and instructions for processor 204. Storage device 210, such as a magnetic disk or optical disk, is provided and coupled to bus 202 for storing data and instructions. Common examples of data processing system 200 may include: personal computers (PCs); work stations, mini-computers; servers; mainframes; and certain LANs or WANs.

Data processing system 200 may be coupled via bus 202 toa display 212, such as a cathode ray tube (CRT), for displaying information to a system user. An input device 214 such as a keyboard, including alphanumeric and/or other keys, is coupled to bus 202 for communicating information and command selections to processor 204. Another type of user input device is cursor control 216, such as a mouse or trackball, or cursor direction keys for communicating direction information and command selections to processor 204 and for controlling cursor movement on display 212.

According to one embodiment of the invention, rating items for carriers is provided by data processing system 200 in response to processor 204 executing one or more sequences of one or more instructions contained in main memory 206. Such instructions may be read into main memory 206 from another computer readable medium, such as storage device 210. Execution of the sequences of instructions contained in main memory 206 causes processor 204 to perform the process steps described herein. One or more processors in a multi-processing arrangement may also be employed to execute the sequences of instructions contained in memory 206. In alternative embodiments, hardwired circuitry may be used in place of, or in combination with, software instructions to implement the invention. Thus, embodiments of the invention are not limited to any specific combination of hardware circuitry and software.

The data processing system 200 may be operated by a user, for example, sitting at a desk with a keyboard as an input device 214, a mouse as a cursor device 216, and a monitor as a display device 212. The user types commands through the keyboard or "clicks" with the mouse on icons displayed on the monitor to execute instructions that cause the data processing system 200 to rate an item. The results of the item rating may be displayed to the user on the monitor or saved to a file in storage device 210 for use by other programs (i.e. an application for printing a bill of lading, printing permits, or applying postage).

The term "computer readable medium" as used herein refers to any medium that participates in providing instructions to processor 204 for execution. Such a medium may take many forms, including but not limited to: non-volatile media such as optical or magnetic disks; volatile media such as dynamic memory; and/or transmission media such as coaxial cables, copper wire, or fiber optic cable. Transmission media can also take the form of acoustic or light waves, such as those generated during radio frequency (RF) and infrared (IR) data communications. Common forms of computer readable media include: a floppy disk; a flexible disk; hard disk; magnetic tape; CD-ROM; DVD; or any medium form from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A second modem, resident at data processing system 200, can receive the instructions on the telephone line and use an infrared transmitter to convert the data into an infrared signal. An infrared detector coupled to bus 202 can receive the data carried in the infrared signal and place the data on bus 202 for further transport. Bus 202 carries the data to main memory 206, from which processor 204 retrieves and executes the instructions. The instructions received by main memory 206 may optionally be stored on storage device 210 either before or after execution by processor 204.

Data processing system 200 also includes a communication device 218 coupled to bus 202. Communication interface 218 provides a two-way data communication coupling to a network link 220 that is connected to a local network 222. For example, communication interface 218 may be an integrated services digital network (ISDN) card or a modem to provide a data communications connection to a corresponding type of telephone line. As another example, communication interface 218 may be a local area network (LAN) card to provide a data communications connection to a compatible LAN. Wireless links may also be implemented. In any such implementation, communication interface 218 sends and receives electrical, electromagnetic, or optical signals that carry digital data streams representing various types of information.

Network link 220 typically provides data communications through one or more networks to other data devices. For example, network link 220 may provide a connection through local network 222 to a host computer 224 or to data equipment operated by an Internet Service Provider (ISP) 226. ISP 226, in turn, provides data communication services through the world-wide packet data communication network, commonly referred to as the "Internet" 228. Local network 222 and Internet 228 both use electrical, electromagnetic, or optical signals that carry digital data streams. The signals through the various networks and the signals on network link 220 and through communication interface 218, which carry the digital data to and from data processing system 200, are exemplary forms of carrier waves transporting the information.

Data processing system 200 can send messages and receive data, including program code, through the network (s), network link 220, and communication interface 218. In the Internet example, a server 230 might transmit a requested code for an application program through Internet 228, ISP 226, local network 222, and communication interface 218. In accordance with the invention, one such downloaded application provides for rating items for carriers.

The received code may be executed by processor 204 as it is received, and/or stored in storage device 210, or other non-volatile storage for later execution. In this manner, data processing system 200 may obtain application code in the form of a carrier wave.

The Data Access System

Figure 3:
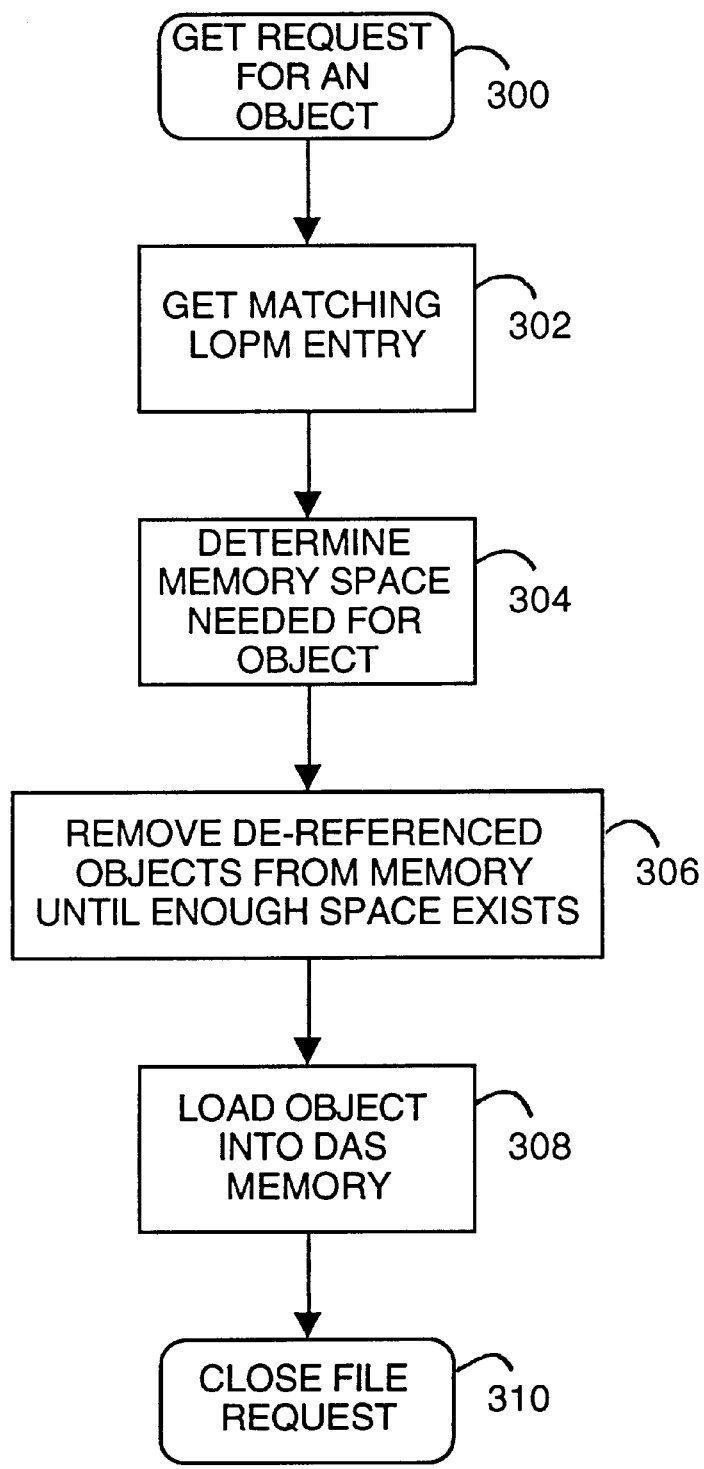
FIG. 3 is an upper level flowchart of the method of utilizing the Data Access System (DAS) within a carrier manager system.

Turning to FIG. 3, there is shown an upper level flowchart of a Data Access System (DAS) which can be employed with a carrier management system. The purpose of the DAS, which gets a request for an object at step 300, is to provide the carrier manager components with access to carrier data for the purposes of either rating or structuring a transaction. Alternatively, step 300 could refer to the initialization of the DAS which occurs only when the DAS is first started up by an application. The DAS performs the data provision in a fast and efficient manner by combining memory management and behavior change techniques that adapt to the system user's historical preference pattens.

From step 300, the method advances to step 302 where a match is performed between the entry from the LOPM and the newly obtained object. If a match is determined, then at step 304, the memory space needed to store the new object is calculated. When it is determined that an object is to be added to the system memory, then, at step 306, the system removes de-referenced objects from the memory, based upon a determination of what available objects are the least frequently used (referenced) and least recently referenced. This determination helps in minimizing the memory footprint of the DAS. The system removes de-referenced objects until enough space exists within the pre-established memory threshold of the DAS to be able to load the new object at step 308. The method then advances to step 310 where the file request is closed.

Establishment and Framework of the DAS

Generally, DAS data consists of a collection of files containing various sets of carrier data. The data is divided into "Logical Object" segments, each of which contains some discrete element of data. These Logical Objects contain information such as: the carrier's description; data relating to a specific carrier service (such as "UPS Ground"); or, data relating to a specific special service (such as "C.O.D." or "Insurance"). Sub-objects and segments of objects can be accessed as well. A "sub-object" is a variation of the DAS object which consists of two standard DAS objects. The first object is an index table where the subobject points to segments in the second object. If a sub-object is requested, then it is looked up in the first object (the index table) and the entry is used as the address to get an object segment. The segment is loaded into memory using the same steps as steps 300–310 described herein.

A segment of an object can be requested if an entire object is not needed. If only a segment is required, then the segment is loaded into memory using steps 300 through 310.

Many other kinds of data can also be stored in a single Logical Object. These Logical Objects are given a "name" to be referred to; these names are referred to as the "Logical Object Name" or LON.

A physical file on a personal computer (PC), or any larger computer (mini-computer, mid-frame, main frame, etc.), can contain any number of Logical Objects and their LONs are listed in a heathr portion of the file that they are a part of. Access to these files, and the Logical Objects that they contain is controlled, by a pair of tables called the Logical Object to Physical File Map (LOPM) and the Full Path Map (FPM). The LOPM is a list of the names of Logical Objects (LONs) and a reference number of the file that they are contained in. The FPM is a list of physical files that correspond to the reference numbers in the LOPM.

To access a Logical Object, a call is made to the DAS to make a request for the Logical Object (using its LON name). The DAS searches the LOPM table to find the LON and retrieves its file reference number. The DAS uses this reference number to search the FPM table in order to find the physical file containing the data object. When the physical file has been found, DAS opens the file, accesses the named data object, and loads it into a section of memory referred to as the "DAS heap." The DAS finally passes the "pointer" (target identifier) to this data (which is now in memory) to the calling entity who can then use the memory pointer to directly access the data. This mechanism relieves the caller from having to perform file I/O (file search and save) and having to allocate and release memory to store the data.

DAS Object Files and Object Management

DAS provides management of Logical Objects, which are contained in a well-defined set of DAS managed files, and that conform to a generic file format, regardless of the format of data contained in each object. The location and retrieval of objects from the set of DAS managed filed is controlled by two standard files the File ID-Full Path Map and the Logical Object to Physical File Map.

1. The File ID-Full Path Map

This file describes the set of files that make up the DAS managed object space. It contains one fixed length entry per DAS Object file in the system. The order of occurrence of file name records in the File ID-Full Path Map corresponds to the 1-indexed FileID reference value in the Logical Object to Physical File Map file.

The BNF of the structure for the File ID-Full Path Map is as follows: FieldID-FullPathMap=

```
FieldID-FullPathMap=
  {FullPathNameOfFile      char[64]
  +FilePermanenceValue     integer4}  (1..Number of Entries)
```

This file is not a DAS managed file, and does not adhere to the standard DAS Object File format. It is loaded into an ObjectBuffer named fileMap during DAS initialization, and is used to translate FileID entries contained in the LOPM into actual operating system dependant file names.

2. The Logical Object to Physical File Map

The Logical Object to Physical File Map is the core of the DAS Object reference system. This file is used to translate the names of Logical Objects into FileIDs and locations within files of specific objects. The file is kept in sort order by Logical Object Name to facilitate binary searching. The Logical Object to Physical File Map is loaded into an object buffer, the LOPM during DAS initialization. The file is structured as follows:

```
LogicalObjectToPhysicalFileMap =
  {LogicalObjectName       char[20]
  +FileID                  integer4
  +ObjectPermanence        integer4
  +ObjectOffset            integer4
  +ObjectLength            integer4
  +ObjectAssociatedData    char[16]}  (1..NumberOfObjects)
```

This file is not a DAS managed file, and does not adhere to the standard DAS Object File format.

3. DAS Object Files

A DAS Object File is a set of Logical Objects, whose names and characteristics are described in the header of the DAS Object File. Logical Objects are variable length data items of various types, which are interpreted by the Carrier Manager processes that traverse them. DAS is not aware the structure or content of Logical Objects.

For each Logical Object in a DAS Object File, there is a directory entry in the DAS Object file header that identifies the Logical Object, and that describes the object's location, length, relative date permanence, and a free-form data field that further qualifies the identity of the object.

The BNF for a generic DAS Object File would be:

```
DASObjectFile =
  DASFileSignature        char[8]:="*DASFILE"
  +NumberOfObjectsInFile  integer2
  +{LogicalObjectName     char[20]
  +ObjectPermanence       integer4
  +ObjectOffset           integer4
  +ObjectLength           integer4
  +ObjectAssociatedData   char[16]}  (1ÖNumberOfObjectsInFile]
  +{DASObject             varchar}(1..NumberOfObjectsInFile)
```

4. BTO, Update, and Recovery Issues

The Logical Object to Physical File Map and file ID-Full Path Map are constructed initially by the BTO process. As new objects are added to the system and old objects are removed, these tables are updated by the DAS Support Tool family. It is the responsibility of the DAS Support Tool family to (1) maintain the Header portion of all DAS Objects Files when additions and deletions occur, (2) maintain the Logical Object to Physical File Map simultaneously with the maintenance of the DAS Object File headers, (3) add and delete DAS Object Files in the File ID-Full Path Map, and (4) reconstruct the Logical Object to Physical File Map from the information in the File ID-Full Path Map and the headers of the referenced DAS Object Files. This maintenance is performed only when Runtime Carrier mranager is not operating.

A mechanism for reconstructing the File ID-Full Path Map has not bee designed in detail at this time. A general approach to reconstructing the File ID-Full Path Map would be to examine the header area of all files, assembling a list of those files that had a valid DAS Object File header. The list could then be used to construct a File ID-Full Path Map which would lack only File Permanence detail. In the absence of File Permanence detail, the File Permanence Detail could be set to a standard, default value. The principal hazard of this approach would be that a list constructed in this way might include entries for files that had been previously retired from active use.

Once the File ID-Full Path Map had been created, the Logical Object to Physical File Map could be reconstructed by examining the headers of all files in the File ID-Full Path Map and extracting the lists of Logical Objects contained within the files. Once all file headers have been processed, the lists could be concatenated and sorted by Logical Object Name to form the Logical Object to Physical File Map.

5. LOPM Directory Services

The Logical Object to Physical File Map is maintained in sort order by logical Object Name in order to facilitate binary searching of the LOPM. As a result, the LOPM can be searched rapidly and once a location is established in the LOPM, the concepts of next and previous entry are supported by the LOPM's ordered structure.

It may be necessary to extract the directory entries of several similarly-named Logical Objects in order to determine which of them is the specific Logical Object desired by a process. A separate DAS finction is provided that will extract the directory entries of all Logical Objects whose names match a partial Logical Object Name. The Carrier Manager function requesting the list of Logical Object Directory Entries could then choose among the Logical Objects selected based on information contained in the free-form data filed ObjectAssociatedData found in each entry.

6. Subobjects and AM Retrieval

There is at times a need for retrieving a portion of a Logical Object that contains smaller, discrete subobject entities as a single aggregate entity. An additional DAS function is needed to perform this operation. The mechanism to manage the retrieval and buffering of subobjects is as follows:

(1) A separate object, containing the index of subobjects for the aggregate Logical Object, is maintained, which contains a set of subobject keys, the subobject offset in the Logical Object, and the subobject length. As an example, an AM Table collection could be viewed as a single object, with an external index of Origins and Services. If the keys were maintained in sort order so that the index object were binary searchable, the Am Table Index Object could have the following structure:

```
IndexTableObject=
    IndexObjectSignature      char[9]="CHARINDEX"
    +LogicalObjectOfIndex     char[20]
    +NumberOfSubObjects       integer2
    +SizeOfIndexKey           integer2
    +{SubObjectKey            char[SizeOfIndexKey]
```

```
    +SubObjectOffset          integer4
    +SubObjectLength          integer4} (1..NumberOfSubObjects)
```

LTL Carriers need to have objects containing an allpoints map, with Origin charts addressed by 5 digit Zip Codes. Lists of these allpoints maps for AM use can have a very large number of entries, and holes for illegal Zip Codes can be ignored when constructing the index maps for the allpoints charts. The allpoints map could be represented in the form:

(LowerZipCode Bound, Upper ZipCode Bound, SubObjectOffset, SubObject Length)

If the range of ZipCodes is treated as continuous, the allpoints map can be represented with only an explicit lower bound in the form:

(Lower ZipCode bound, SubObject offset, SubObject Length)

with an implied upper bound of less than the next index entry. This allows for a 5 digit zipcode index object of the form:

```
5DigitIndexObject=
    IndexObjectSignature      char[9]="5DIGINDEX"
    +LogicalObjectOfIndex     char[20]
    +NumberOfSubObjects       integer2
    +{MinOriginKey            integer4
    +SubObjectOffset          integer4
    +SubObjectLength          integer4} (1..NumberOfSubObjects)
```

This structure would be searchable using the GenBinSrch() function defined in the Am Design Document, section 5 (General Binary Searching of Directory Entires).

(2) In order to retrieve a subobject, a separate DAS Function call would be made:

DASGetSubObject(IndexTableObjectLogicalName, SubObjectKeyString)

which would return a pointer to an object buffer. The index type would be established by examining the index signature at the beginning of the index object to determine what search mechanism would be used for the index. Subobjects would be registered in the AOBL with the name of the parent Logical Object, concatenated with the subobject's offset into the logical object. For example, if I wanted to retrieve the subobject for orginal 064, service 'GR', in the Logical Object UPSAMTABLE, which has an index UPSAMTABLEINDEX, I would issue a call in the form DASGetSubObject("UPSAMTABLEINDEX","064GR") and retrieve the table. If the subobject were at offset 0x1000 in the parent object, the subobject would be registered in the LOPM as "UPSAMTABLE.0x1000", so that later calls could retrieve it without having to redo the physical read of the subobject.

Though the detailed architecture of the DAS has been described in reference to FIG. 3 and hereinabove, the flow of the method to be employed within the DAS framework is shown beginning with FIG. 4A.

Figure 4A:
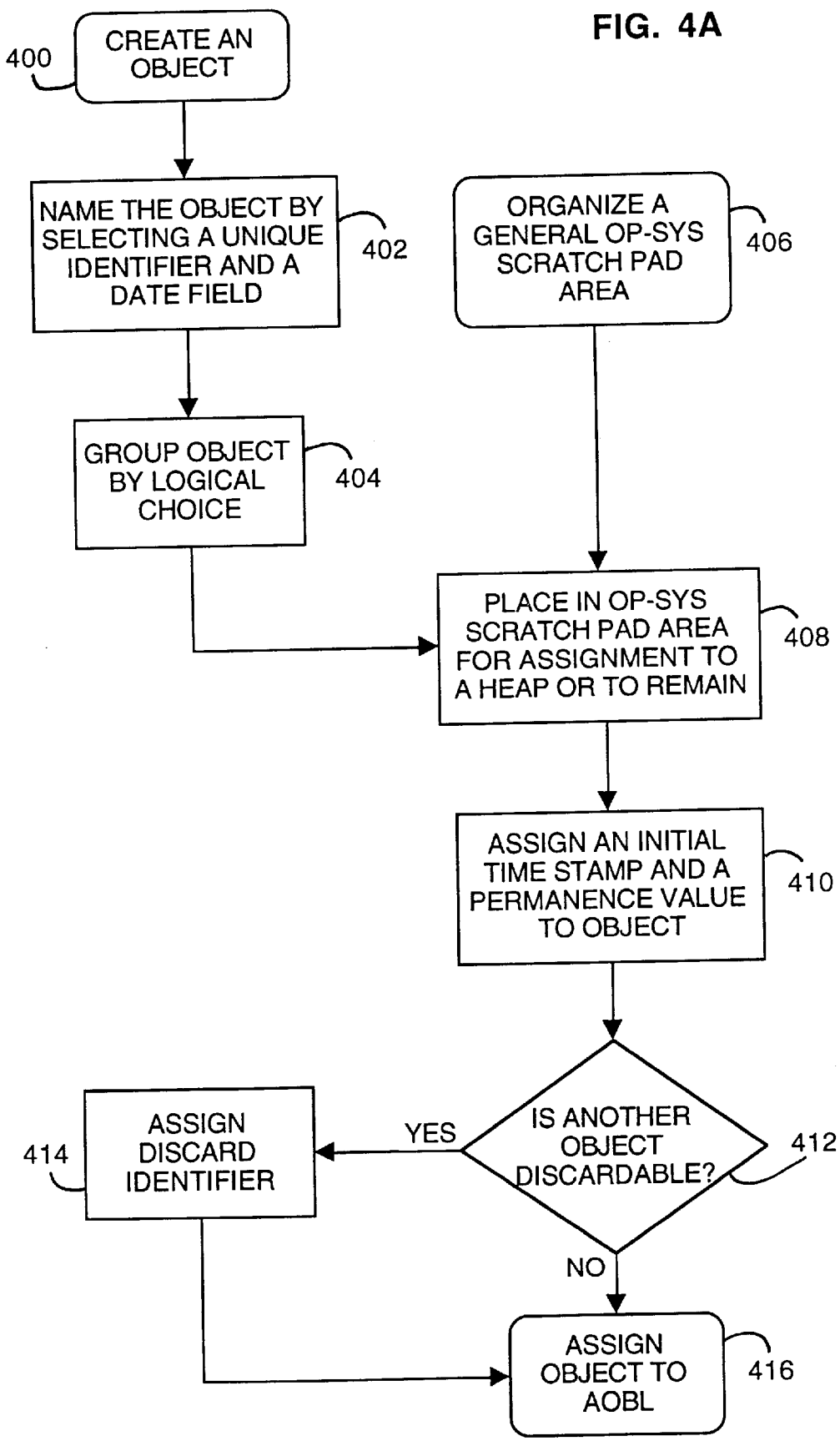
FIG. 4A is detailed flowchart of the method shown in FIG. 3.

Turning to FIG. 4A, there is shown a flowchart of the method flow within the DAS system. The method begins with the creation, at step 400, of an object to be stored. From creation of the object, the method advances to step 402 where the object is named with a unique identifier and a date field. The object naming mechanism is further discussed with respect to FIG. 5 hereinbelow.

Independently of the creation of the object, a general operating system scratch pad area is created, at step 406, as a function of the operating system. The scratch pad is used, at step 408, for moving data objects from file to file or to be stored while in transit.

Returning to step 402, the method advances to step 404 where created objects are grouped by logical choice (i.e., objects identified by common headers are placed within the same object table). The method advances from step 404 to step 408.

After assignment of the object to the operating system scratch pad, the method assigns, at step 410, an initial time stamp and a permanence value to the object. Additionally, the method queries at step 412 as to whether or not the object is discardable or should be maintained within the LOPM. If the response to the query is "YES," then the method advances to step 414 where a discard identifier is assigned to the object before advancing to step 416 to assign the object to the AOBL. If, however, the response to the query at step 412 is "NO," then a discard identifier is not issued to the object and the method advances directly to step 416.

Figure 4B:
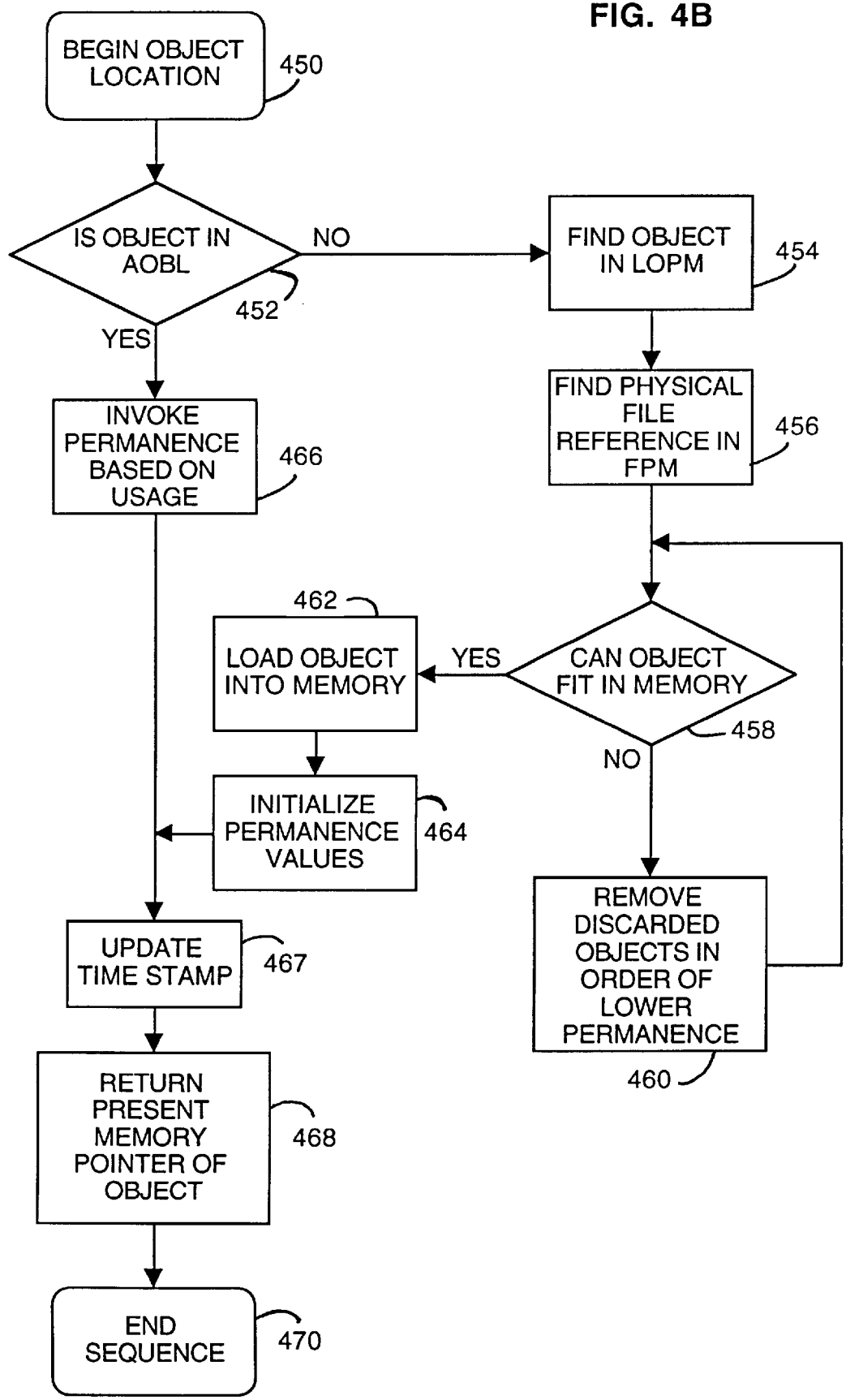
FIG. 4B is a continuation of the detailed flowchart of FIG. 4A.

Turning to FIG. 4B, there is shown a flowchart of the DAS method of operation with respect to the initiation of an application within the greater carrier management system. This flow begins with the location of the object at step 450. The object is found by its object name.

The method advances from step 450 to step 452 where the system queries as to whether or not the object can be located in the AOBL. If the response to the query is "YES," then the method advances to step 466 where permanence is invoked based upon the usage history of the particular object. The method advances from step 466 to step 467 where the object's time stamp is updated; the method then procedes to step 468 where the present memory pointer of the object is returned. From step 468, the method advances to step 470 and ends the object sequence.

If the response to the query at step 452 is "NO," then the method advances to step 454 where the method locates the object in the LOPM where an initial permanence value is assigned and the value of the object is constantly weighed. The method than advances to step 456 to find a physical file reference in the FPM. The method then causes the system to determine, at step 458, whether or not the object can fit into memory. If the response to the determination is "NO," then the system seeks to remove, at step 460, discarded objects in order of lower permanence. After removing discarded objects, the method returns to enter the method flow in front of the query at step 458.

If the response to the query at step 458 is "YES," then the method advances to step 462 where the object is loaded into memory and permanence values are initialized at step 464. The method flows from step 464 to enter the flow in front of step 468. At step 468, the present memory pointer of the object is returned and the method advances to step 470 where the sequence is ended.

Figure 5:
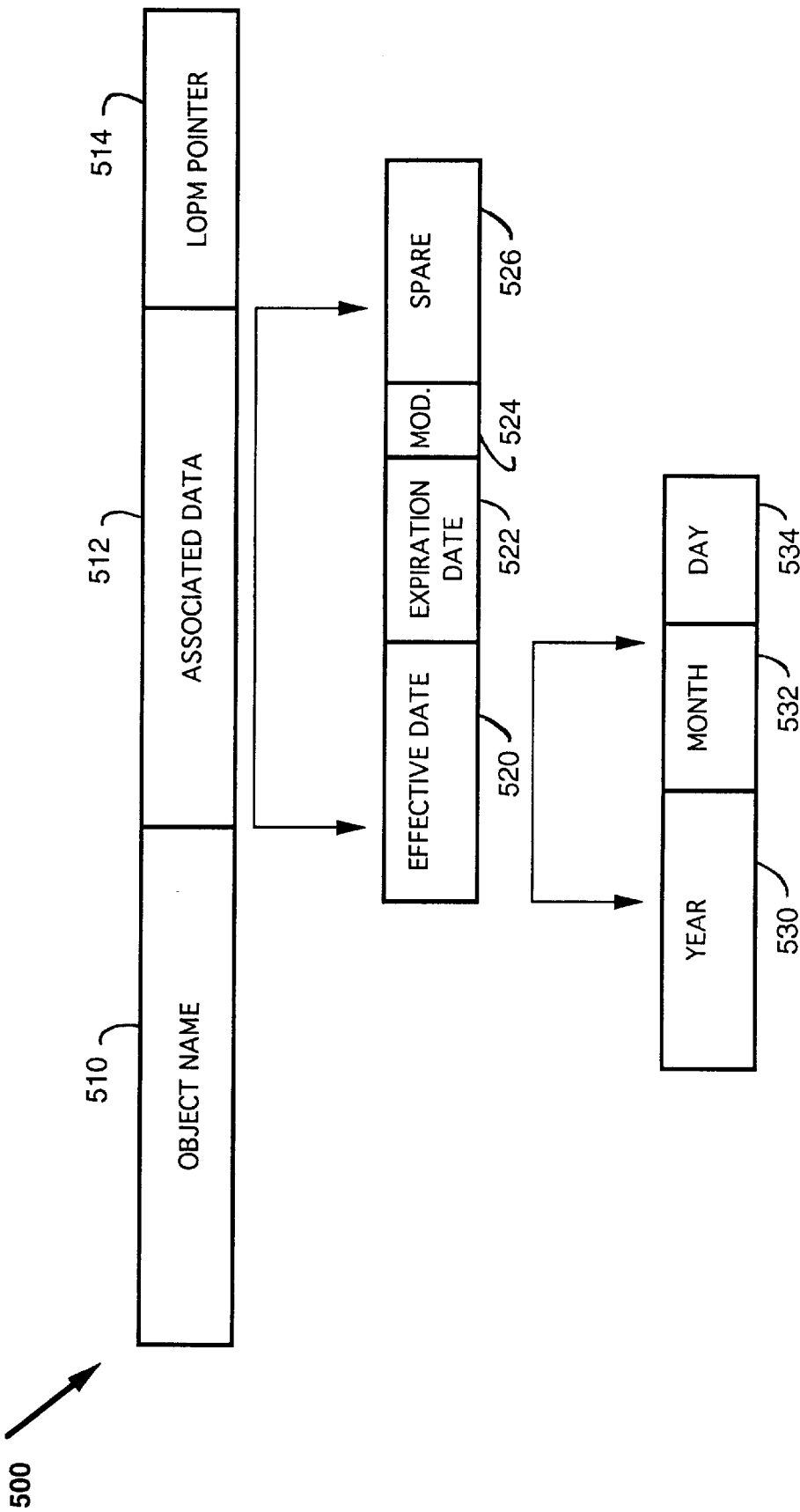
FIG. 5 is a block diagram of the identification convention for implementation changes utilized within objects of the Data Access System.

Turning to FIG. 5, there is shown a block diagram of the LOPM directory table for each Logical Object. Modifications to the DAS consist of changes to several of its components. First, the returned results from the function call "DAS_GetLOPM_Entry" return a pointer to a table 500 that consists of the DAS object names matching the input argument 510, the associated data of the named object 512, and a pointer 514 to the LOPM entry describing the named object.

The associated data 512 is further divided into fields describing the effective date 520, the expiration date 522, and the modification status 524 of the named object. The modification status byte 524 indicates the present state of the data object as the original, unmodified object (represented by "R"), a custom data object (represented by "C"), or as a dual data object (represented by "D"). Additional status codes can be defined on an "as required" basis. An additional data field 526 is available on a "spare field" basis. The date fields can be further described by the format YYYYMMDD in BCD. The format translates to year 530, month 532, and day 534 fields. The storage order makes it possible to perform a binary search of the fields.

Three additional DAS functions are required. These functions are: DAS_GuessObject; DAS_GuessSubObject; and DAS_GuessObject Segment. These functions are analagous to the three DAS functions that are used to get a data object by using an exact match to the object name. These functions operate on an Indefinite Logical Object Name (ILON) and parameters that make up a selection criteria on which to base the choice of an object.

For DAS_GuessObject and DAS_GuessSubObject, the input arguments are:
1. the ILON;
2. the Shipment Date; and
3. the desired Status Byte (which can be optional).

For DAS_GuessObjectSegment, the input arguments are:
1. the ILON;
2. the Object Offset;
3. the Object Length;
4. the Shipment Date; and
5. the desired Status Byte (which can be optional).

The ILON is a 14 byte name. The selection of the targeted logical object is made according to the following rules:
1. Based upon the 14 byte indefinite name, a list of matching objects is assembled (using the DAS_GetLOPM_Entry function call); and
2. The list is further reduced to a list of eligible logical objects by selecting objects that are effective and not yet expired (based upon the shipment date).

If a Status Byte is supplied as an argument, a pointer to the effective logical object with the matching Status Byte is returned. If no status argument is supplied, then a pointer to an original Logical Object is returned. The selection between several effective Logical Objects having the same status is controlled by the Instance Count portion of the Logical Name.

While this invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims.

What is claimed is:

1. In a data processing system, a method of loading a data object into a Data Access System of a carrier management system comprising the steps of:
   (a) receiving a request for an object;
   (b) determining whether or not said object resides in a first data table wherein said first data table is indicative of a plurality of characteristics of said object; and if said object is not resident in said first data table then assigning an initial time stamp and a permanence value;
   (c) determining memory space, in said Data Access System, required for storing said object;
   (d) removing de-referenced objects from said memory until space is available that is greater than or equal to said memory requirement of said object; and
   (e) loading said object into said memory for use within said carrier management system.

2. The method of claim 1, wherein said object is requested by name and by data field.

3. The method of claim 1, wherein said object is assigned to a data table.

4. A Data Access System of a carrier management system comprising:
   (a) receiving means for receiving a request for an object;
   (b) determining means for determining whether or not said object resides in a first data table wherein said first data table is indicative of a plurality of characteristics of said object; and if said object is not resident in said first data table then assigning an initial time stamp and a permanence value;
   (c) memory means for storing said object;
   (d) determining means for determining memory capacity for a set of de-referenced objects in said memory and further for determining when space is available that is greater than or equal to said memory requirement of said object; and
   (e) loading means for loading said object into said memory for use within said carrier management system.

5. The directory table of claim 4, wherein said directory table is further comprised of:
   (a) an object name;
   (b) a set of associated data; and
   (c) an object table data pointer.

6. The associated data of claim 5, further comprising:
   (a) an effective date;
   (b) an expiration date; and
   (c) a modification status.

* * * * *